(12) United States Patent
Zouboff

(10) Patent No.: US 7,945,421 B2
(45) Date of Patent: May 17, 2011

(54) METHOD OF DETECTING A REFERENCE ZONE ARRANGED ON THE PERIPHERY OF A TOOTHED DISK FASTENED TO A ROTARY COMPONENT, WITH A VIEW TO DETERMINING THE ANGULAR POSITION OF SAID ROTARY COMPONENT

(75) Inventor: Pierre Zouboff, Toulouse (FR)

(73) Assignee: Continental Automotive France, Toulouse (FR)

( * ) Notice: Subject to any disclaimer, the term of this patent is extended or adjusted under 35 U.S.C. 154(b) by 145 days.

(21) Appl. No.: 12/097,050

(22) PCT Filed: Dec. 11, 2006

(86) PCT No.: PCT/EP2006/011887
§ 371 (c)(1),
(2), (4) Date: Jun. 12, 2008

(87) PCT Pub. No.: WO2007/068419
PCT Pub. Date: Jun. 21, 2007

(65) Prior Publication Data
US 2008/0312865 A1    Dec. 18, 2008

(30) Foreign Application Priority Data
Dec. 12, 2005  (FR) ................................. 05 12542

(51) Int. Cl.
*G01P 3/00*    (2006.01)

(52) U.S. Cl. ........................................ 702/151; 702/145
(58) Field of Classification Search .................. 702/151
See application file for complete search history.

(56) References Cited

U.S. PATENT DOCUMENTS 4,697,168 A * 9/1987 Baker ............................ 341/15
4,797,827 A * 1/1989 Cockerham ................... 701/101

FOREIGN PATENT DOCUMENTS

| EP | 1 462 638 A1 | 9/2004 |
| FR | 2 818 737 | 6/2002 |
| FR | 2 860 069 A1 | 3/2005 |

* cited by examiner

Primary Examiner — Jonathan C. Teixeira Moffat
(74) Attorney, Agent, or Firm — Young & Thompson

(57) ABSTRACT

A method of detecting a reference zone formed on the periphery of a toothed disk integral with a rotary part, for determining the angular position of the rotary part. According to this detection method, when a reference zone is expected and at the time of the detection of a tooth (n) at a time $t_n$, there is defined a time window [tmin, tmax] of duration depending on the time period $T_n$ separating the detection of the tooth (n) and the detection of the preceding tooth (n−1), and the reference zone is considered present in the absence of detection of a tooth (n+1) during the time window [tmin, tmax]. Moreover, the duration of each time window [tmin, tmax], calculated from a measured time period $T_n$, is adjusted by modulating that duration by a correction parameter equal to $\Delta T = T_n - T_{n-1}$.

3 Claims, 2 Drawing Sheets

METHOD OF DETECTING A REFERENCE ZONE ARRANGED ON THE PERIPHERY OF A TOOTHED DISK FASTENED TO A ROTARY COMPONENT, WITH A VIEW TO DETERMINING THE ANGULAR POSITION OF SAID ROTARY COMPONENT

RELATED APPLICATION

The application is a National Stage of PCT/EP2006/011887 filed Dec. 11, 2006 and claims priority to French application 05/12542 filed Dec. 15, 2005.

BACKGROUND OF THE INVENTION.

The invention relates to a method of detecting a reference zone formed on the periphery of a toothed disk integral with a rotary part, for the purpose of determining the angular position of said rotary part.

DESCRIPTION OF THE RELATED ART

Control computers for internal combustion engines ("EMS" for "Engine Management System" or "ECU" for Engine Control Unit) need to know accurately the longitudinal position of each piston inside its cylinder, as well as the engine stroke (for example induction, compression, combustion, exhaust, for a four-stroke engine) in order to ensure the management of said engines under the best conditions.

Conventionally, this information is obtained by firmly fixing to the crankshaft a toothed disk comprising equidistant teeth of identical length. Moreover, in order to count in a sure manner the complete revolutions made by the crankshaft, each disk is provided with a reference zone materialized by the absence, at the periphery of said toothed disk, of one or more successive marks, teeth or notches.

According to this principle, the toothed disk rotates in front of a sensor designed to detect the teeth and thus to determine the angular position of the crankshaft and therefore the position of the pistons connected to the latter by connection rods.

One of the imperatives regarding such a method is the obligation to systematically detect the reference zone which constitutes, in fact, the only mark making it possible to guarantee the synchronization of the data.

For this purpose, the first method described in particular in FR2818737 consists in measuring the time period elapsing between two successive teeth, and at the time of detection of a tooth n, in comparing an arithmetic combination of times $(T_{n-2}, T_n)$ with the time $T_{n-1}$, (where $T_i$ corresponds to the period separating the detection of the tooth (i) from the detection of the preceding tooth (i−1)). According to this principle, the reference zone is considered to be detected when the arithmetic combination $(T_{n-2}, T_n)$ is less than $T_{n-1}$.

The major disadvantage of this method is that the detection of the reference zone is carried out with a degree of delay: the reference zone is, in fact, detected not when it passes in front of the sensor but only after detection of the tooth located after that reference zone.

Another method, described in particular in FR2860069, overcomes this disadvantage and detects the reference zone in real time.

For this purpose, this method consists, when the reference zone is expected and at the time of detection of a tooth (n) at a time $t_n$:

in defining a time interval [tmin, tmax], called a time window, of duration depending on the time period $T_n$ separating the detection of the tooth (n) from the detection of the preceding tooth (n−1), and in considering the reference zone to be present in the absence of detection of a tooth (n+1) during the time period corresponding to the time window [tmin, tmax].

Moreover, this method also consists, at the time of detection of the reference zone, in simulating a first imaginary tooth at the end of the time window having determined said detection, then possibly, in the absence of detection of a real tooth (n+1), a new imaginary tooth at the end of each following time period depending on $T_n$.

Such a method therefore makes it possible, as mentioned above, to detect the reference zone in real time. Moreover, because of the simulation of imaginary teeth, it makes it possible to provide data relating to the angular position of the crankshaft when the sensor is facing the reference zone.

However, in practice it proves that such a method can result in non-detections of the reference zone, in particular when there are big changes in the speed of rotation of the engines.

Moreover, the transmitted items of information relating to the angular position of the crankshaft, when the sensor is facing the reference zone, proves to be of very relative accuracy.

SUMMARY OF THE INVENTION

The present invention aims to overcome these disadvantages and its essential purpose is to provide a method of detecting a reference zone formed on the periphery of a toothed disk making it possible to detect said reference zone systematically making use of a computing method that is "economical" in terms of time and complexity of computation.

Another purpose of the invention is to provide a method of detecting a reference zone making it possible to improve the accuracy of the calculations relating to the angular position of the crankshaft in this reference zone.

For this purpose, the invention relates to a method of detecting a reference zone formed on the periphery of a toothed disk, of the type of method described above with reference to FR2860069, consisting in defining time windows. According to the invention, this detection method is characterized in that the duration of each time window [tmin, tmax], calculated from a measured time period $T_n$, is adjusted by modulating this duration by means of a correction parameter proportional to $\Delta T = T_n - T_{n-1}$, where $T_{n-1}$ is the time period separating the detection of the tooth (n−1) from the detection of the preceding tooth (n−2).

According to the method of the invention, the duration of each time window is therefore determined by taking account of the data representing changes in engine speed, accelerations, decelerations, during time periods immediately preceding that time window.

This taking into account of the instantaneous behavior of the engine results in an optimized calculation of the duration of the time windows and provides a method guaranteeing a systematic detection of the reference zones.

Moreover, the calculations required for the implementation of this method are limited to simple operations of subtraction (calculation of $\Delta T$) and therefore necessitate very reasonable time and computing power.

According to an advantageous implementation aimed at perfecting the detection method according to the invention, after detection of a tooth (n) at a time $t_n$, the time window [tmin, tmax] is centered with respect to a time tmoy adapted such that the value (tmoy−$t_n$) is equal to the value $T_n$ modulated by a correction parameter proportional to $\Delta T$.

Thus, not only the duration but also the temporal position of the time windows are optimized due to the taking into account of the instantaneous behavior of the engine.

Moreover, at the time of detection of the reference zone, there is advantageously simulated, according to the invention, a first imaginary tooth at the end of the time window having determined said detection, and then, possibly, in the absence of detection of a real tooth (n+1), a new imaginary tooth at the end of each following time period equal to the value $T_n$ modulated by a correction parameter $\Delta T$.

Due to the concept of the method of the invention, the imaginary teeth can be simulated accurately in time, and can thus be used as a basis for the transmission of accurate data relating to the angular position of the crankshaft when the sensor is facing the reference zone.

Moreover, the modulation of the time period $T_n$ advantageously consists in adding to this time period a correction parameter equal to $\alpha.\Delta T$, where $0<\alpha\leq 1$.

Moreover, according to the invention, at the time of detection of a reference zone materialized by the absence, at the periphery of the toothed disk, of x successive marks, teeth or notches, the coefficient $\alpha$ is advantageously determined specifically, for each type of engine, during an initial calibration phase consisting in adjusting the value of said coefficient in order to obtain the simulation of x marks in the reference zone, for a range of acceleration/deceleration values that is as large as possible.

According to another advantageous implementation of the invention, the duration of each time window [tmin, tmax] is equal to $2.\beta.(T_n+\alpha.\Delta T)$ where $\beta$ is a coefficient determined specifically, for each engine type, during an initial calibration phase consisting in adjusting the value of said coefficient to the maximum values of acceleration/deceleration of said engine.

Moreover, when the reference zone is not expected and at the time of detection of each tooth passing in front of the sensor, there is also defined, advantageously according to the invention, a time window whose duration is simply dependent on the time period $T_n$ separating the detection of the tooth (n) from the detection of the preceding tooth (n−1).

Such a time window whose determination requires a very short computing time principally makes it possible:
- to eliminate possible parasitic signals occurring before the "opening" of said window,
- to simulate an imaginary tooth in the absence of non-justified detection of a real tooth.

BRIEF DESCRIPTION OF THE DRAWINGS

Other features, purposes and advantages of the invention will emerge from the following detailed description referring to the appended drawings which, by way of non-limiting example, show one of its advantageous implementations. In these drawings.

DESCRIPTION OF THE PREFERRED EMBODIMENT

Figure 1:
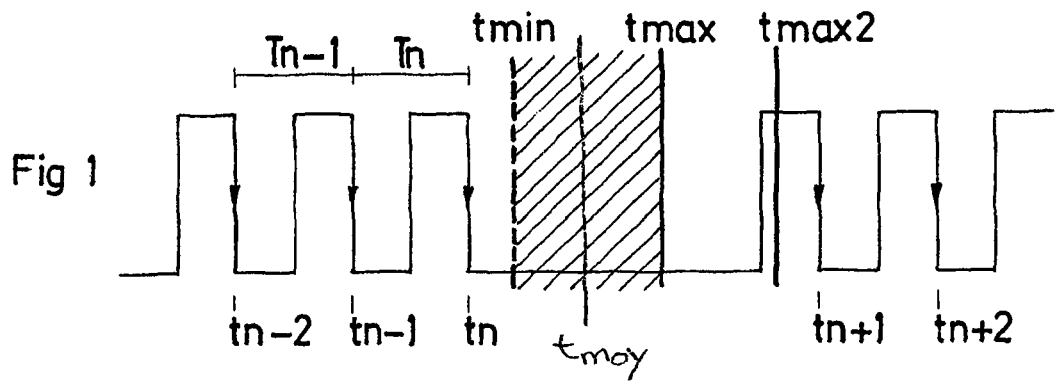
FIG. 1 is an explanatory diagram of the method according to the invention for detecting a reference zone of a toothed disk.

The invention described below with reference to the figures aims at the detection of a reference zone formed on the periphery of a toothed disk integral with a rotary part such as a crankshaft, for the purpose of determining the angular position of said rotary part.

Conventionally, this method is used by means of a sensor positioned in such a way as to detect the successive teeth formed on the periphery of the toothed disk.

Moreover, the toothed disk used comprises, in the usual manner, teeth uniformly distributed over the periphery of said disk, said series of teeth being interrupted in one zone, called the reference zone, materialized by the absence of x teeth.

By way of example, there are 58 teeth uniformly distributed with a relative spacing of 6°, and the reference zone is materialized by the absence of two teeth, in order to cover an angular sector of 18° extending between the falling edge of the tooth in position 58 and the falling edge of the tooth in position 1.

According to the principle of the invention, two types of processing are carried out as a function of the angular sector of the toothed disk facing the sensor, and more specifically as a function of the position (i) of the detected tooth ($1\leq i \leq 58$ according to the above example).

The first type of processing deals with the teeth that are not likely to directly constitute the upstream boundary of the reference zone, that is to say teeth during the detection of which it is useless to check the presence, directly downstream of said teeth, of the reference zone.

The second type of processing, specific to the invention, relates to the teeth likely to constitute the upstream boundary of the reference zone, that is to say teeth during the detection of which it is imperative to check for the presence, directly downstream of said teeth, of the reference zone.

For a disk such as described above, provided with 58 teeth, the first type of processing logically deals with the teeth from position 1 to position 57, and the second type of processing deals solely with tooth 58. However, in practice, the checking for the presence of the reference zone is carried out starting from a tooth of position less than 58, for example of position 56, in order to take account of the possibility of an accidental non-detection of one or two teeth by the sensor.

The first type of processing is a so-called linear processing, of the type described in FR2860069. As mentioned above, it normally deals with teeth from position 1 to 56, in the example of a disk with 58 teeth, and the teeth of position (n+1) to (n−3) according to the example shown in the figures.

The principle of this processing consists, at the time of the detection, at a time ti, of a tooth of position (i), in defining a time window $[T_i.(1-\beta), T_i.(1+\beta)]$, where:

$T_i$ is the time period separating the detection of the tooth (i) from the detection of the preceding tooth (i−1), and $\beta$ is a coefficient determined specifically, for each type of engine, during an initial calibration phase consisting in adjusting the value of said coefficient to the maximum acceleration/deceleration values of said engine.

Moreover, this time window is centered with respect to the time $t_1+T_i$.

The main purpose of the creation of such time windows is:
to eliminate possible parasitic signals occurring before the "opening" of said windows,
to simulate an imaginary tooth in the unexplained absence of detection of a real tooth.

The second type of processing, specific to the invention, is used, as described above, when the reference zone is "expected".

Such as shown in FIG. 1, this processing consists, firstly, at the time of detection, at a time $t_n$, of a tooth of position n, in defining a time window [tmin, tmax], where:

tmin=$t_n$+($T_n$+α.ΔT).(1−β),
tmax=$t_n$+($T_n$+α.ΔT).(1+β),
ΔT=$T_n$−$T_{n-1}$, $T_n$ is the time period separating the detection of the tooth (n) from the detection of the preceding tooth (n−1),
$T_{n-1}$ is the time period separating the detection of the tooth (n−1) from the detection of the preceding tooth (n−2),
and α is a coefficient such that 0<α≦1, determined specifically for each type of engine, during an initial calibration phase consisting in adjusting the value of said coefficient in order to obtain the simulation of two teeth in the reference zone, for a range of acceleration/deceleration values that is as wide as possible.

Moreover, this time window [tmin, tmax] is centered with respect to the time $t_n$+($T_n$+α.ΔT).

Moreover, according to this processing method, when no tooth is detected in the time window, an imaginary tooth is simulated at the time tmax corresponding to the end of that window.

Subsequently, a second imaginary tooth is simulated at the time tmax2=tmax+($T_n$+α.ΔT), if no real tooth has been detected between tmax and tmax2.

Finally, a third imaginary tooth can possibly be simulated at the time tmax3=tmax2+($T_n$+α.ΔT), if no real tooth has been detected between tmax2 and tmax3.

Such a processing method guarantees a systematic detection of the reference zone of a toothed disk using an "economical" computing method in terms of time and computing complexity.

Moreover, this processing method results in optimizing the process of simulation of imaginary teeth and therefore in improving the accuracy of the calculations relating to the angular position of the crankshaft in the reference zone.

Figure 2A:
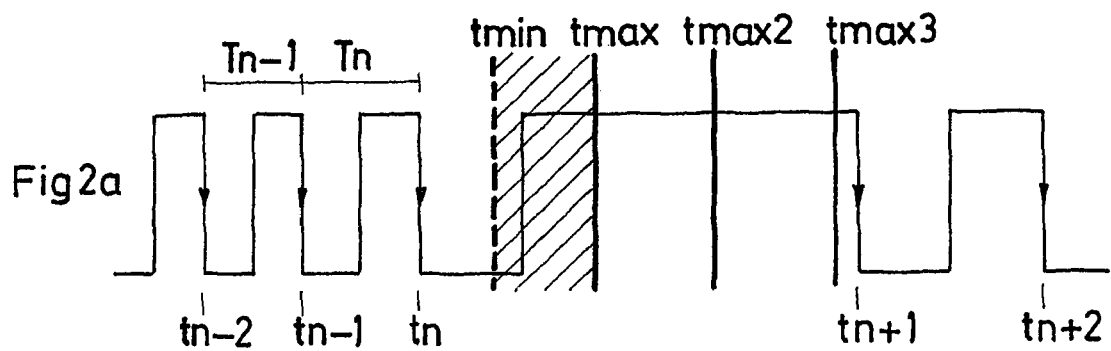
FIGS. 2a and 2b are diagrams representing, in a comparative manner, the results respectively obtained with the method, called linear, described in FR2860069 (FIG. 2a), and with the method according to the invention (FIG. 2b), during a phase of deceleration of an engine.
Figure 2B:
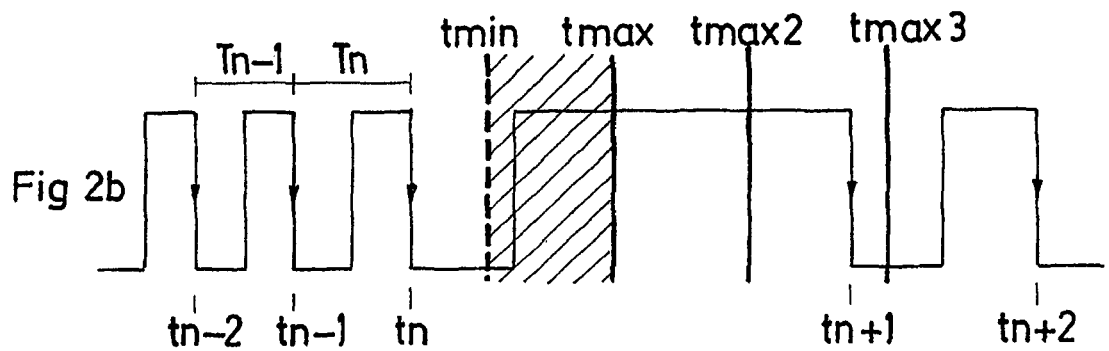
Figure 3A:
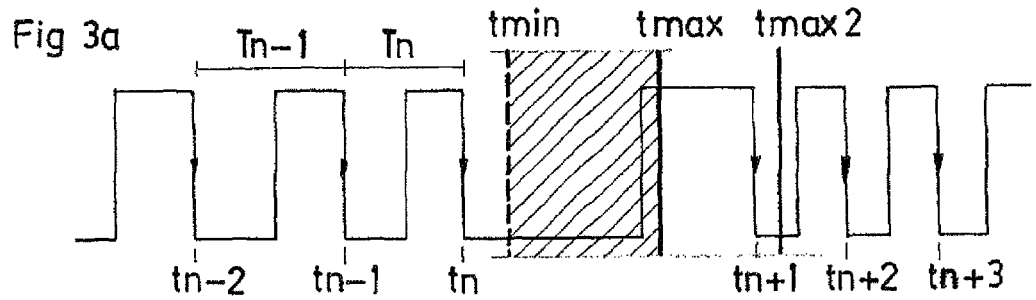
FIGS. 3a and 3b are two diagrams representing, in a comparative manner, the results obtained respectively with the linear method described in FR2860069 (FIG. 3a) and with the method according to the invention (FIG. 3b), during a phase of acceleration of an engine.
Figure 3B:
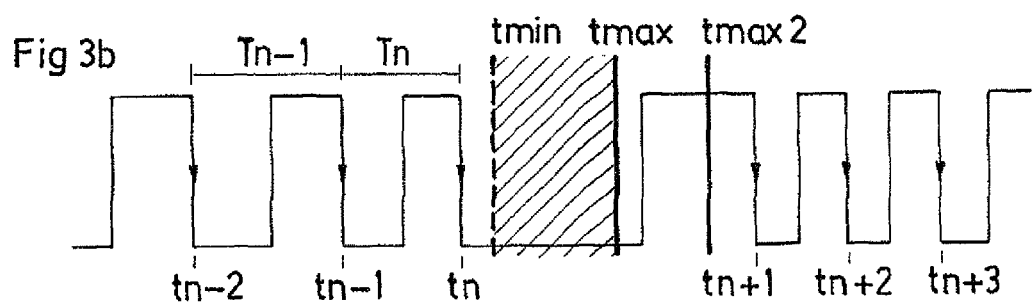
Figure 4A:
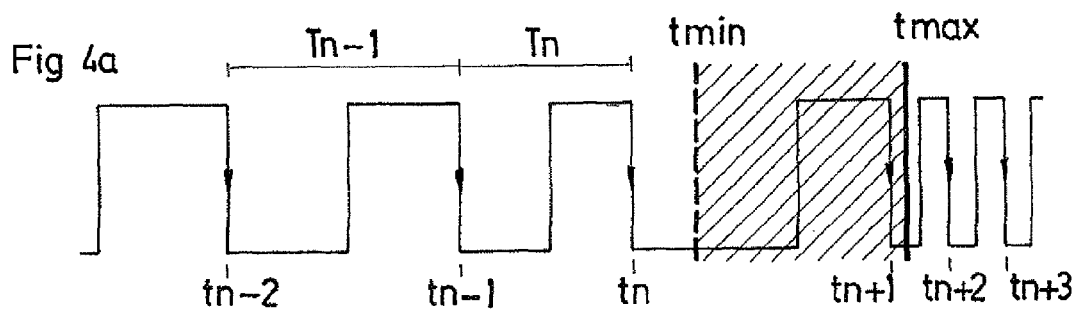
FIGS. 4a and 4b are two diagrams representing, in a comparative manner, the results obtained respectively with the linear method described in FR2860069 (FIG. 4a) and with the method according to the invention (FIG. 4b), during a phase of strong acceleration of an engine.
Figure 4B:
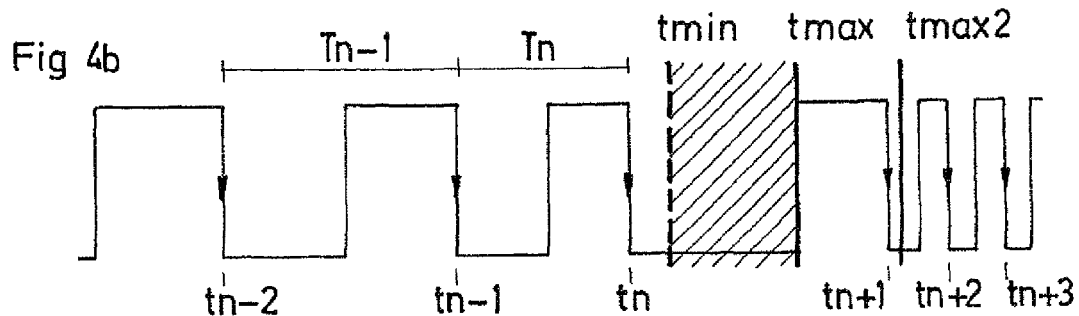

The performance of the method according to the invention for detecting the reference zone of a toothed disk is illustrated by way of example in FIGS. 2b, 3b and 4b, by comparison with the performance obtained, in identical conditions, during the use of a linear processing method such as described in F2860069.

Firstly, FIGS. 2a and 2b illustrate an example corresponding to a deceleration of the engine in the reference zone.

In this hypothesis, it emerges from the analysis of FIGS. 2a and 2b that the reference zone is perfectly detected.

On the other hand, it is observed, in FIG. 2a, that the linear processing method can result in the simulation of three imaginary teeth and therefore result in the transmission of notably incorrect data regarding the angular position of the crankshaft.

On the contrary, the method according to the invention results in the simulation of two teeth, that is to say a number of teeth equal to the number of missing teeth, and therefore makes it possible to notably reduce the calculation errors related to the positioning of the imaginary teeth.

FIGS. 3a and 3b illustrate an example corresponding to an acceleration of the engine in the reference zone.

In this illustration, it emerges from the analysis of these two figures that the reference zone is perfectly detected.

On the other hand, in FIG. 3a it is observed that the linear processing method results in the simulation of a single imaginary tooth and therefore results in the transmission of notably incorrect data regarding the angular position of the crankshaft.

On the contrary, the method according to the invention results in the simulation of two teeth, that is to say a number of teeth equal to the number of missing teeth, and therefore makes it possible to notably reduce the calculating errors related to the positioning of the imaginary teeth.

Finally, FIGS. 4a and 4b illustrate an example corresponding to a very strong acceleration of the engine in the reference zone.

In this hypothesis, it emerges from FIG. 4a that the linear processing method does not make it possible to simulate an imaginary tooth before the appearance of the first real tooth delimiting the reference zone. Consequently, the reference zone is not detected, resulting in a total loss of synchronization.

On the contrary, as shown in FIG. 4b, the method according to the invention makes it possible to simulate an imaginary tooth and therefore results in the detection of the reference zone.

The invention claimed is:

1. A method of detecting a reference zone formed on the periphery of a toothed disk integral with a rotary part for the purpose of determining the angular position of said rotary part, said detection method comprising, when the reference zone is detected to be present and at the time of detection of a tooth (n) at a time $t_n$:

by a computer, determining a time interval (tmin, tmax), called a time window, of duration depending on the time period $T_n$ separating the detection of the tooth (n) from the detection of the preceding tooth (n−1), by the computer, detecting the reference zone to be present in the absence of detection of a tooth (n+1) during the time period corresponding to the time window (tmin, tmax), by the computer, adjusting the duration of each time window (tmin, tmax), calculated from a measured time period $T_n$, by modulating the duration of each time window (tmin, tmax) by a correction parameter proportional to ΔT=$T_n$−$T_{n-1}$, where $T_{n-1}$ is the time period separating the detection of the tooth (n−1) from the detection of the preceding tooth (n−2), and after detection of a tooth (n) at a time $t_n$, by the computer, centering the time window (tmin, tmax) with respect to a time tmoy adapted such that the value (tmoy−$t_n$) is equal to the value $T_n$ modulated by a correction parameter proportional to ΔT, further comprising, at the time of detection of the reference zone, by the computer, simulating a first simulated tooth at the end of the time window having determined said detection, and then, in the absence of detection of a real tooth (n+1), a new simulated tooth at the end of each following time period equal to the value $T_n$ modulated by a correction parameter ΔT, and comprising the further step of, by the computer, detecting a reference zone materialized by the absence, at the periphery of the toothed wheel, of x successive marks, teeth or notches, wherein the modulation of the time period $T_n$ comprises adding to the time period $T_n$ a correction parameter equal to α.ΔT, where 0<α≦1, and the coefficient α is determined specifically, during an initial calibration phase comprised of adjusting the value of said coefficient in order to obtain the simulation of x marks in the reference zone, for a range of acceleration/deceleration values.

2. The detection method as claimed in claim 1, wherein the duration of each time window (tmin, tmax) is equal to $2.\beta.(T_n+\alpha.\Delta T)$, where $\beta$ is a coefficient determined specifically, during an initial calibration phase comprised of adjusting the value of said coefficient to the maximum values of acceleration/deceleration of said rotary part.

3. A method of detecting a reference zone formed on the periphery of a toothed disk integral with a rotary part for the purpose of determining the angular position of said rotary part, said detection method comprising, when the reference zone is detected to be present and at the time of detection of a tooth (n) at a time $t_n$:

by a computer, determining a time interval (tmin, tmax), called a time window, of duration depending on the time period $T_n$ separating the detection of the tooth (n) from the detection of the preceding tooth (n−1), by the computer, detecting the reference zone to be present in the absence of detection of a tooth (n+1) during the time period corresponding to the time window (tmin, tmax), by the computer, adjusting the duration of each time window (tmin, tmax), calculated from a measured time period $T_n$, by modulating the duration of each time window (tmin, tmax) by a correction parameter proportional to $\Delta T = T_n - T_{n-1}$, where $T_{n-1}$ is the time period separating the detection of the tooth (n−1) from the detection of the preceding tooth (n−2), and after detection of a tooth (n) at a time $t_n$, by the computer, centering the time window (tmin, tmax) with respect to a time tmoy adapted such that the value (tmoy−$t_n$) is equal to the value $T_n$ modulated by a correction parameter proportional to $\Delta T$, wherein the modulation of the time period $T_n$ comprises adding to this time period a correction parameter equal to $\alpha.\Delta T$, where $0 < \alpha \leq 1$, and wherein the duration of each time window [tmin, tmax] is equal to $2.\beta.(T_n+\alpha.\Delta T)$, where $\beta$ is a coefficient determined specifically, during an initial calibration phase comprised of adjusting the value of said coefficient to the maximum values of acceleration/deceleration of said rotary part.

* * * * *